US007000089B2

(12) United States Patent
Durr et al.

(10) Patent No.: US 7,000,089 B2
(45) Date of Patent: Feb. 14, 2006

(54) ADDRESS ASSIGNMENT TO TRANSACTION FOR SERIALIZATION

(75) Inventors: William Durr, Forest Grove, OR (US); Bruce M. Gilbert, Beaverton, OR (US); Robert Joersz, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 10/325,552

(22) Filed: Dec. 20, 2002

(65) Prior Publication Data

US 2004/0123015 A1 Jun. 24, 2004

(51) Int. Cl.
*G06F 12/00* (2006.01)

(52) U.S. Cl. .......................... 711/202; 711/5; 711/147; 707/3; 712/218

(58) Field of Classification Search .................... 711/5, 711/140, 170, 171, 172, 173, 104, 147, 158, 711/169; 712/218; 707/3
See application file for complete search history.

(56) References Cited

U.S. PATENT DOCUMENTS 5,243,699 A * 9/1993 Nickolls et al. .............. 712/11
5,649,160 A * 7/1997 Corry et al. ................ 711/167
6,088,800 A * 7/2000 Jones et al. ................. 713/189
6,128,244 A * 10/2000 Thompson et al. .... 365/230.03
6,154,816 A * 11/2000 Steely et al. ................ 711/150
6,321,303 B1 * 11/2001 Hoy et al. .................. 711/140
6,434,699 B1 * 8/2002 Jones et al. ................. 713/168

* cited by examiner

*Primary Examiner*—Brian R. Peugh
(74) *Attorney, Agent, or Firm*—Abdy Raissinia

(57) ABSTRACT

The assignment of an address to a transaction for serialization purposes is disclosed. A simulated address is assigned to a transaction of a first type. The simulated address may be determined by selecting a mask based on one or more bits of a command type attribute of the transaction, and performing a logical OR operation on the highest bits of the mask with a number of bits determined by concatenating various bits of various attributes of the transaction. The lowest bits of the resulting simulated address can be incremented for each transaction assigned a simulated address having the same highest bits. The transaction is serialized relative to other transactions of the first type, such as I/O-related transactions, utilizing a serialization approach for transactions of a second type. The serialization approach may be an existing approach already used to serialize transactions of the second type, such as coherent transactions.

20 Claims, 5 Drawing Sheets

ADDRESS ASSIGNMENT TO TRANSACTION FOR SERIALIZATION

BACKGROUND OF THE INVENTION

1. Technical Field

This invention relates generally to transactions, such as input/output (I/O) requests and their responses, and more particularly to serializing such transactions.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

Multi-processor systems usually include one or more memory controllers to manage memory transactions from the various processors. The memory controllers negotiate multiple read and write requests emanating from the processors, and also negotiate the responses back to these processors. Usually, a memory controller includes a pipeline, in which transactions, such as requests and responses, are input, and actions that can be performed relative to the memory for which the controller is responsible are output.

For transactions to be serviced correctly, usually they need to be serialized so that they are performed in the correct order. Serialization may occur within the pipeline of a memory controller, or prior to the transactions entering the pipeline. Transactions are commonly serialized by utilizing the cache addresses of memory lines to which they relate. This allows the serialization logic, for instance, to distinguish transactions from one another based on their addresses.

Typically, there is a serialization logic for each type of different transaction. For instance, non-coherent input/output (I/O)-related transactions may have one type of serialization logic, whereas coherent memory-related transactions may have another type of serialization logic. While this is a workable approach, it means that serialization logic must be developed for each type of different transaction, which can be time-consuming. Furthermore, space on an integrated circuit (IC) must be allocated for each developed serialization logic, which may be at a premium. For these and other reasons, therefore, there is a need for the present invention.

SUMMARY OF THE INVENTION

The invention relates to the assignment of an address to a transaction for serialization purposes. In a method of the invention, a simulated address is assigned to a transaction of a first type. The transaction is then serialized relative to other transactions of the first type, utilizing a serialization approach for transactions of a second type.

A system of the invention includes a plurality of processors, local random-access memory (RAM) for the plurality of processors, and at least one memory controller. The memory controller(s) manage transactions relative to the local RAM. Each controller assigns simulated addresses to those of the transactions that are of a first type, and serializes such transactions utilizing a serialization for those of the transactions that are of a second type.

A memory controller of the invention includes a pipeline having a number of stages to serialize and convert transactions to sets of actions to effect the transactions. Those of the transactions of a first type are assigned simulated addresses prior to serialization utilizing a serialization approach for those of the transactions of a second type. Other features, aspects, embodiments and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DESCRIPTION OF THE PREFERRED EMBODIMENT

Overview

Figure 1:
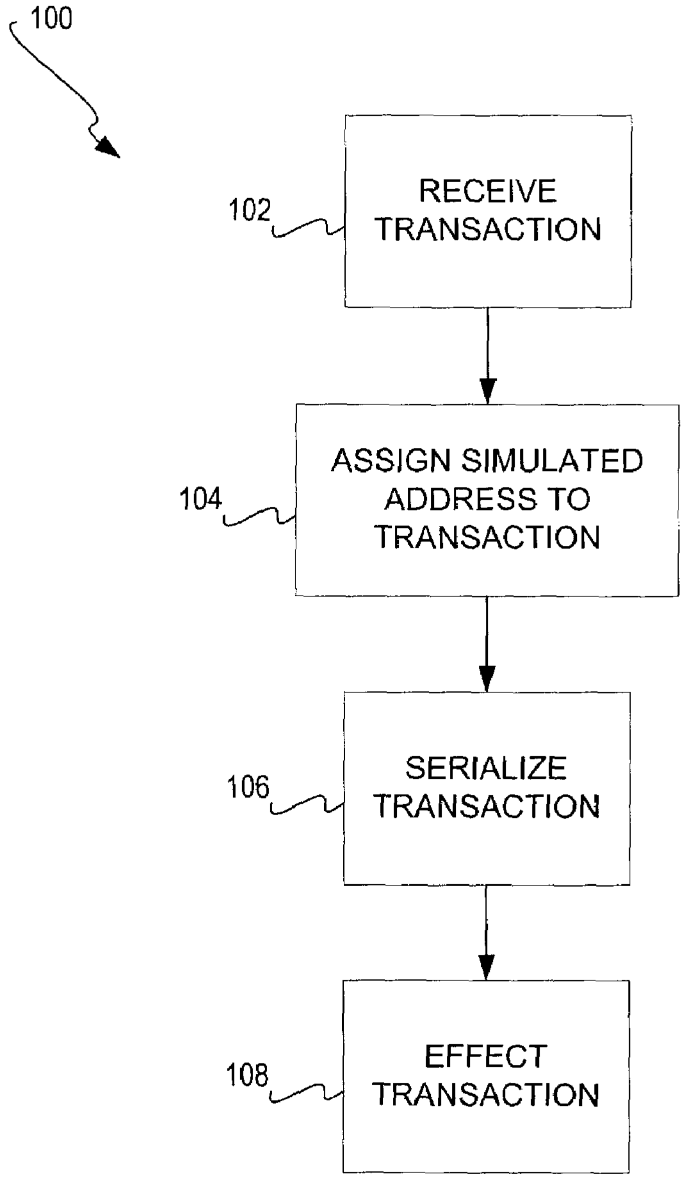
FIG. 1 is a flowchart of a method according to a preferred embodiment of the invention, and is suggested for printing on the first page of the patent.

FIG. 1 shows a method 100 according to a preferred embodiment of the invention. The method 100 can be implemented as an article of manufacture having a computer-readable medium and means in the medium for performing the functionality of the method 100. The medium may be a recordable data storage medium, a modulated carrier signal, or another type of medium. The method 100 may be used in conjunction with the conversion of a transaction into a concurrent set of performable actions using a multiple-stage pipeline. The method 100 preferably is operable within a multiple-processor system in which the transactions relate to memory requests and memory responses from and to the processors, to properly manage the memory vis-a-vis the processors. The method 100 specifically processes allows for serializing transactions, while in the pipeline or prior to pipeline entry.

The method 100 first receives a transaction that is of a first type (102). The type of the transaction may be such that the transaction is an input/output (I/O)-related transaction, such as a memory-mapped I/O (MMIO) transaction. Such transactions are typically non-coherent, in that they are not cached, and thus do not have cache addresses to which they relate. The transaction may be a request for an action to be performed, or a response to a previous request for action. An example of a specific type of MMIO transaction is specifically a control status register (CSR) transaction, which relates to the CSR of a system.

A simulated address is assigned to the transaction (104). The simulated address is preferably a fake, or manufactured, address, that does not correspond or is otherwise non-representative of an actual utilizable address. That is, the simulated address does not refer to actual cache memory of the system. The simulated address is desirably unique as compared to any other simulated addresses that may have been previously assigned to transactions of the same (first) type, especially as to transactions that are still in the pipeline. This ensures that the transaction is uniquely identifiable by its simulated address, as compared to other transactions of the same type.

Once the transaction has been assigned a simulated address, it can then be serialized relative to other transactions that have been assigned other simulated addresses (106). Preferably, serialization is performed utilizing an existing serialization approach, or process, for transactions of a different, or second, type. For instance, the serialization approach may be that which already exists and already used for transactions that relate to cached memory.

Thus, the simulated address assigned to the transaction in 104 is used to serialize the transaction relative to other transactions of the first type in 106. That is, the serialization approach may be geared for transactions of the second type, such that transactions of the first type have simulated addresses assigned thereto that enable the same approach to be used to serialize the transactions of the first type, too. The simulated addresses that are assigned are such that they enable the transactions of the first type to be serialized as if they were transactions of the second type.

Finally, the transaction is effected (108). This means that processing occurs on the transaction so that it can be performed, or realized. For example, the pipeline may be used to convert the transaction into a set of concurrently performable actions.

Technical Background

Figure 2:
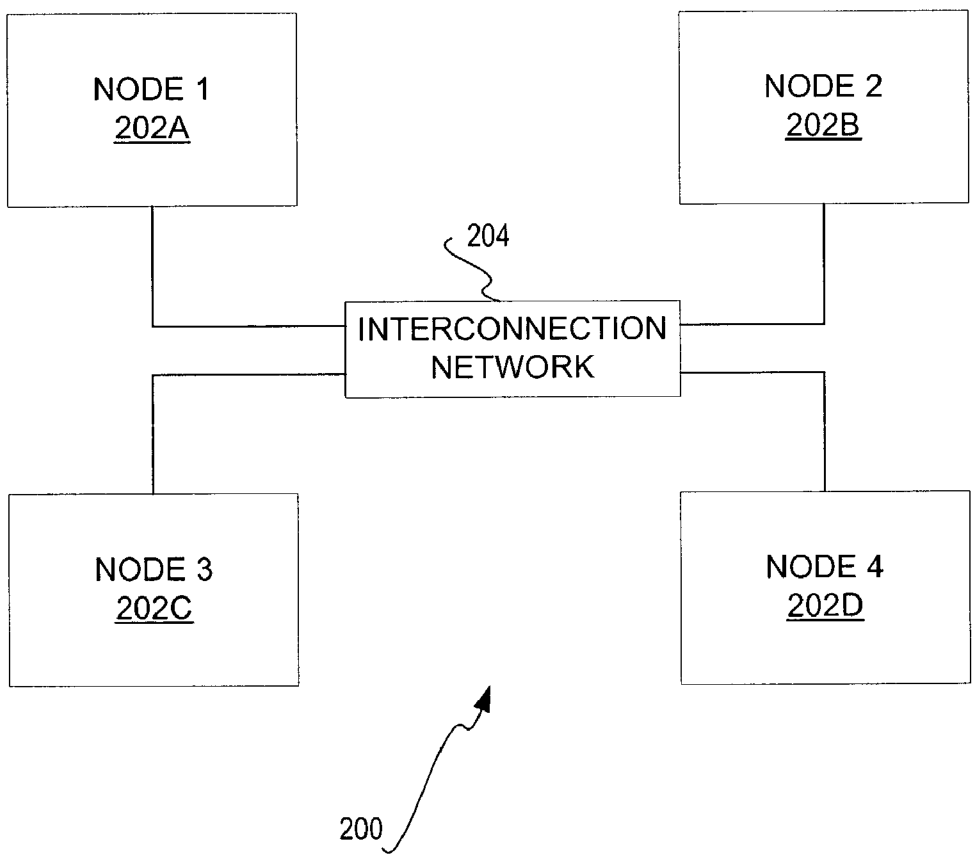
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
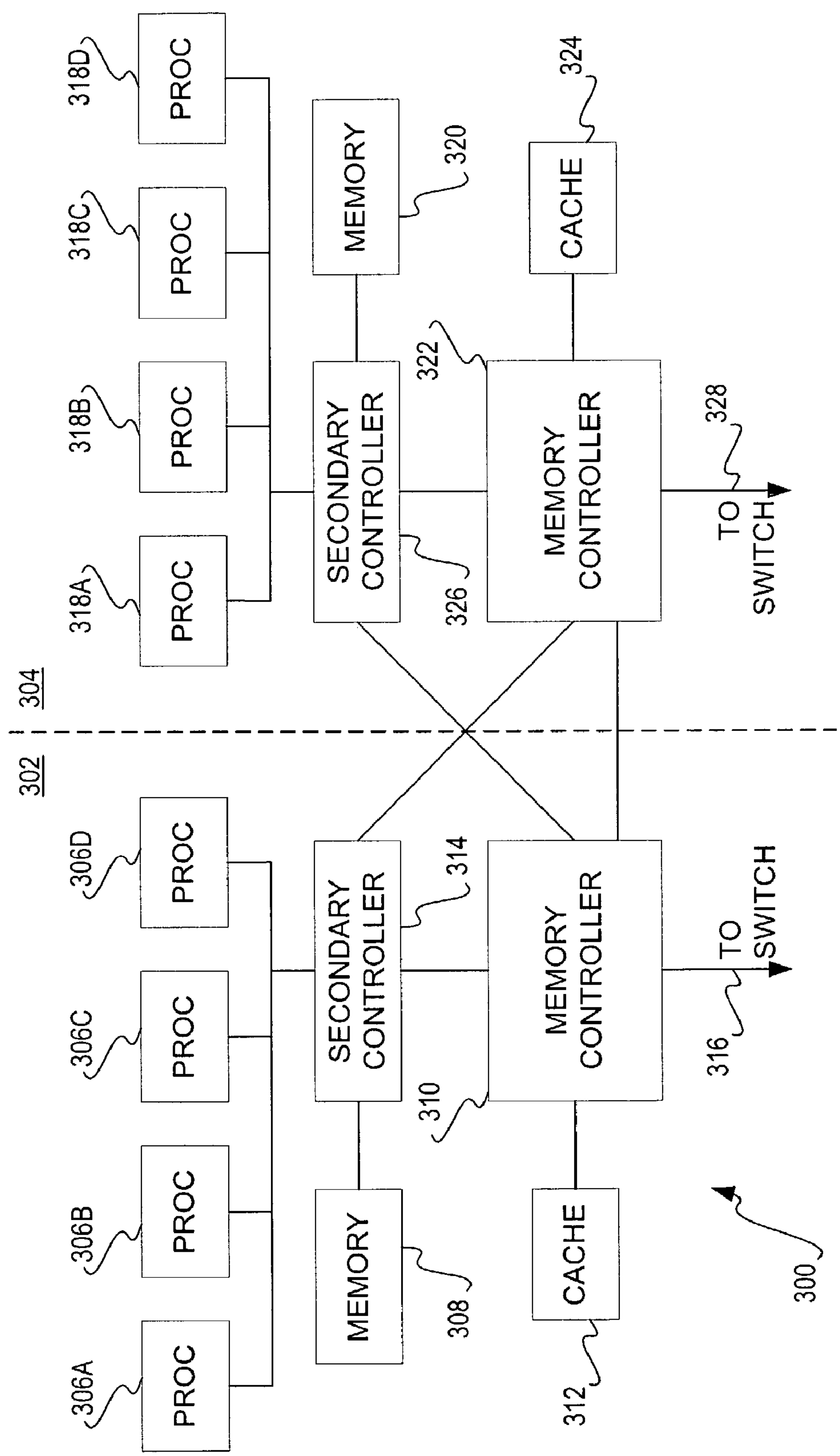
FIG. 3 is a diagram of one of the nodes of the system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. The node 300 is divided into a left part 302 and a right part 304. The left part 302 has four processors 306A, 306B, 306C, and 306D, collectively referred to as the processors 306, whereas the right part 304 has four processors 318A, 318B, 318C, and 318D, collectively referred to as the processors 318.

The processors 306, memory bank 308, and secondary controller 314 constitute a first quad. Likewise, the processors 318, memory bank 320, and secondary controller 326 constitute a second quad. Each of these two quads shares the services of the controllers 310 and 322 and the caches 312 and 324 to form a node of eight processors with associated memory and caches. The memory controller 310 and the cache 312 service even addresses for both quads, and the memory controller 322 and the cache 324 service odd addresses for both quads.

Each quad accesses both even and odd addresses, but these accesses are segregated into even and odd for service by the respective memory controller and cache. The left part 302 has a left memory bank 308, whereas the right part 304 has a right memory bank 320. The memory banks 308 and 320 represent the respective random-access memory (RAM) local to the parts 302 and 306 respectively. The memory bank 308 contains all local memory for the first quad, and the memory bank 320 contains all local memory for the second quad.

The left memory controller 310 manages even address requests to and responses from both memory banks 308 and 320, whereas the right memory controller 322 manages odd address requests to and responses from both memory banks 308 and 320. Each of the controllers 310 and 322 may be an applications-specific integrated circuit (ASIC) in one embodiment, as well as another combination of software and hardware. To assist management of the banks 308 and 320, the controllers have caches 312 and 324, respectively. A left secondary controller 314 specifically interfaces the memory bank 308, the processors 306, and both memory controllers 310 and 322 with one another, and a right secondary controller 326 specifically interfaces the memory bank 320, the processors 318, and both memory controllers 310 and 322 with one another.

The left memory controller 310 is able to communicate directly with the right memory controller 322, as well as the secondary controller 326. Similarly, the right memory controller 322 is able to communicate directly with the left memory controller 310 as well as the secondary controller 314. Each of the memory controllers 310 and 322 is preferably directly connected to the interconnection network that connects all the nodes, such as the interconnection network 204 of FIG. 2. This is indicated by the line 316, with respect to the memory controller 310, and by the line 328, with respect to the memory controller 322.

Figure 4:
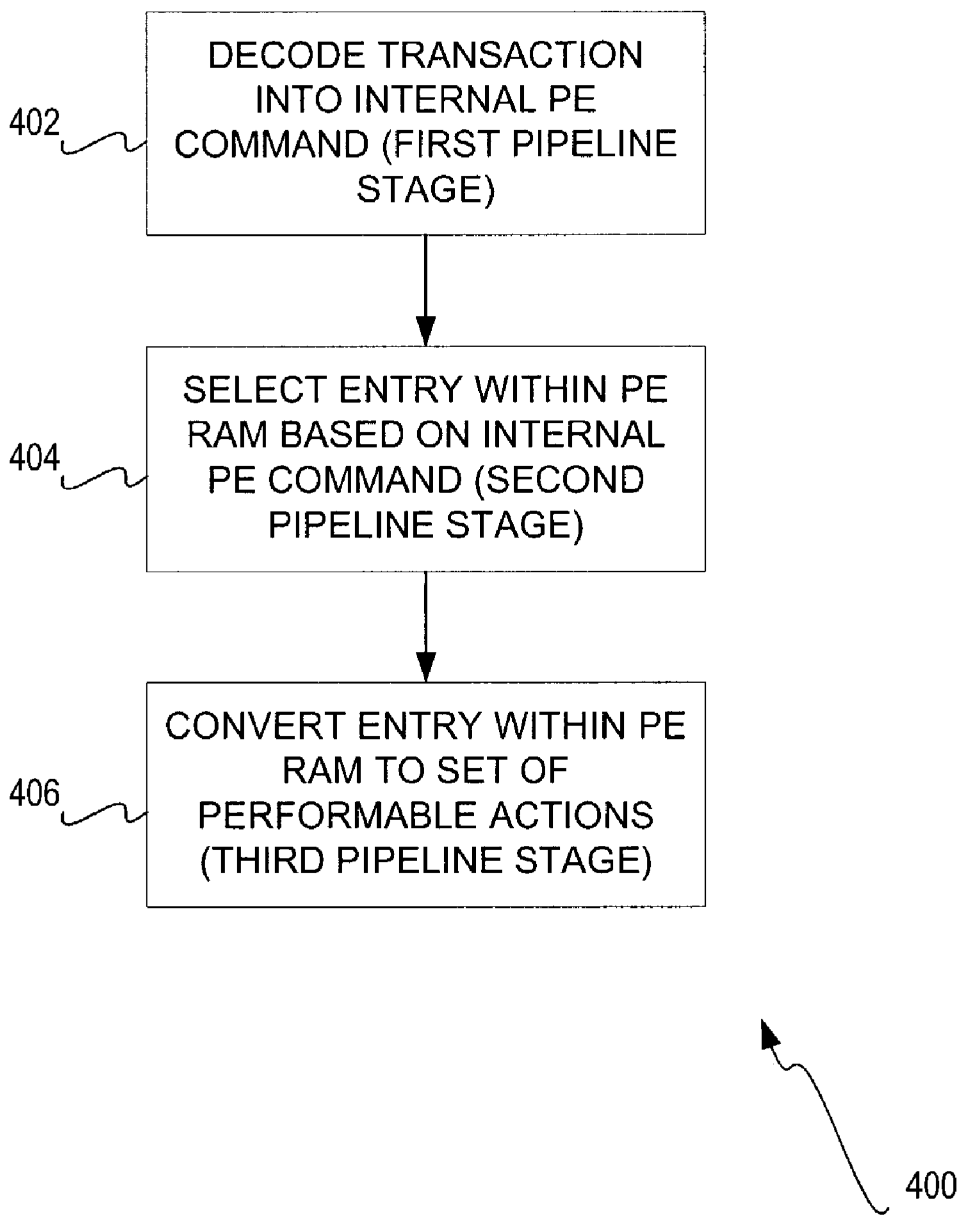
FIG. 4 is a flowchart of a method for converting transactions in a multiple-stage pipeline, in conjunction with which embodiments of the invention may be implemented.

FIG. 4 shows a method 400 for converting a transaction into a concurrent set of performable actions in a number of pipeline stages, in accordance with which embodiments of the invention may be implemented. Prior to performance of the method 400, arbitration of the transaction among other transactions may be accomplished to determine the order in which they enter the pipeline. The serialization of transactions may be performed in one of the stages of the pipeline, or prior to entry of the transactions into the pipeline. Thus, the method 100 of FIG. 1 that has been described may be performed before transaction entry into the pipeline, or once the transaction has entered the pipeline.

In a first, decode, pipeline stage, a transaction is decoded into an internal protocol evaluation (PE) command (402). The internal PE command is used by the method 400 to assist in determining the set of performable actions that may be concurrently performed to effect the transaction. In one embodiment, a look-up table (LUT) is used to retrieve the internal PE command, based on the transaction proffered. There may be more than one LUT, one for each different type of transaction. For instance, the method 400 may utilize a coherent request decode random-access memory (RAM) as the LUT for coherent memory requests, a non-coherent request decode RAM as the LUT for non-coherent memory requests, and a response decode RAM as the LUT for memory responses.

In a second, integration, pipeline stage, an entry within a PE RAM is selected based on the internal PE command (404). The PE RAM is the memory in which the performable actions are specifically stored or otherwise indicated. The entry within the PE RAM thus indicates the performable actions to be performed for the transaction, as converted to the internal PE command. In one embodiment, the PE command is first converted into a base address within the PE RAM, and an associated qualifier having a qualifier state, which is then used to select the appropriate PE RAM entry. Furthermore, the transaction may be arbitrated among other transactions within the second pipeline stage. That is, the transactions may be re-arbitrated within the second stage, such that the order in which the transactions had entered the pipeline may be changed.

In a third, evaluation, pipeline stage, the entry within the PE RAM is converted to a concurrent set of performable actions to effect the transaction (406). In one embodiment, this is accomplished by selecting the concurrent set of performable actions, based on the entry within the PE RAM, where the PE RAM stores or otherwise indicates the actions to be performed. Once the performable actions have been determined, the conversion of the transaction to the performable actions is complete. The actions may then be preferably concurrently dispatched for performance to effect the transaction relative to the memory of the multiple-processor system.

Serializing Transactions

Figure 5:
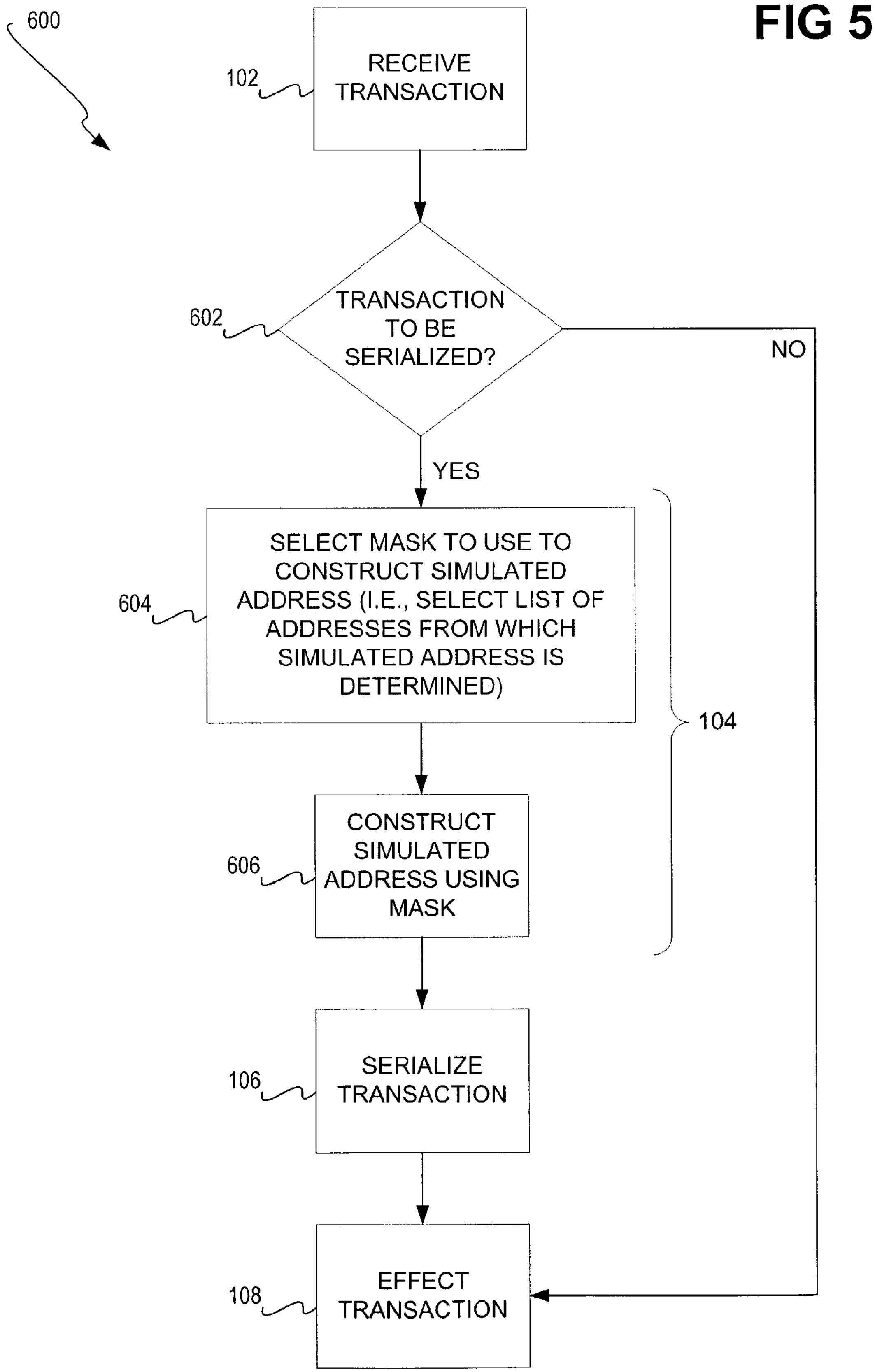
FIG. 5 is a flowchart of a method for serializing transactions that is consistent with but more detailed than the method of FIG. 1, according to an embodiment of the invention.

FIG. 5 shows a method 600, according to an embodiment of the invention, that is consistent with but more detailed than the method 100 of FIG. 1. The method 600 may be performed on a transaction, preferably either before the transaction enters a pipeline or while it is in the pipeline. The transaction is initially received (102), as before. In one embodiment, the transaction has a seven-bit command type attribute, where the bits can be referenced as [6:0]. The transaction may have other attributes as well. For instance, the transaction may have an additional, four-bit attribute [3:0] that is used for making further distinctions between different transactions, and a four-bit source attribute [3:0] that specifies the source of the transaction. The transaction may also have a single-bit use-map attribute [0], which specifies the memory map to be used for the transaction.

In one embodiment, the transaction may or may not have to be serialized. This can be indicated in the sixth bit, [6], of the command type attribute. If the bit is one, then the transaction is to be serialized, whereas if it is zero, then the transaction is not to be serialized. If the transaction is not to be serialized (602), then the method 600 proceeds to effect the transaction (108), as has been described. That is, the transaction is converted to a set of concurrently performable actions, which are then performed to effectuate the transaction.

However, if the transaction is to be serialized (602), then it is assigned a simulated address (104). In one embodiment, this includes first selecting a mask for constructing the simulated address (604). For example, there may be a number of different masks, where each mask corresponds to a different list of addresses from which the simulated address is selected, or determined. In one embodiment, the mask is selected based on bits [5:3] of the command type attribute. Because there are three such bits, the mask is thus selected from a total of $2^3$, or eight, different masks. The mask has a set length desirably equal to the length of a cache address, such as 24 bits, or [23:0]. The highest bits of the mask are then used to construct the highest bits of the simulated address, such as the bits [23:7] of the mask.

The simulated address is constructed using the mask (606). That is, it can be said that the simulated address is selected from one of a list of addresses corresponding to the different masks. In one embodiment, the highest bits of the simulated address are determined by performing a logical OR operation on the highest bits of the mask with a number of bits determined by concatenating various bits of various attributes of the transaction. For instance, two zero bits may be concatenated with bits [5:0] of the command type attribute, bits [3:0] of the additional attribute, bits [3:0] of the source attribute, and the single bit [0] of the use-map attribute. The two zero bits are the highest bits of the resulting concatenation, and the single bit [0] of the use-map attribute is the lowest bit of the resulting concatenation. The resulting 17 bits are then logically OR'ed with the bits [23:7] of the mask to determine the highest 17 bits of the simulated address.

The lowest seven bits are determined by starting with zero, or 1 x0000000, and for each transaction that has the same highest 17 bits for a simulated, increasing by one thereafter. For instance, the first transaction having as its simulated address a given highest 17 bits has 1x0000000 as the lowest seven bits for its simulated address. The second transaction having these same highest 17 bits for its simulated address has 0x0000001 as the lowest seven bits for its simulated address, and so on. This effectively serializes subsequently received transactions that have the same highest 17 bits for their simulated addresses, in lists of addresses corresponding to the masks.

Once the simulated address has been determined, the transaction can be serialized (106). In one embodiment, this is accomplished by utilizing an already existing serialization scheme or approach that is used for serializing transactions of a different type that have addresses comparable to the simulated addresses. Finally, the transaction is effected (108), such as by conversion into a set of concurrently performable actions, performing these actions, and so on.

Alternative Embodiments

The simulated addresses for transactions that are to be serialized can be constructed in manners other than that which has been described in conjunction with the method 600 of FIG. 5. For instance, a single mask may be used, instead of one of a number of different masks. In this case, the same mask is used on all the transactions that are to be serialized. Masks may be constructed in different ways than that which has been described, such as by using different attributes, different bits of different attributes, and different orders of attributes, than described in conjunction with the method 600.

As another example, a number of lists of addresses may be employed without utilizing a mask, to construct the simulated addresses. The lists may be selected randomly, in a round-robin manner, or there may only be one list. As transactions arrive, they are assigned an address within one of the lists of addresses. Where there is only one list, it may start as a base address, and each successive transaction that needs to be serialized is assigned the base address, plus a counter, that is incremented after a transaction has been assigned an address. Still other approaches for assigning simulated addresses to transactions are also within the scope of the invention.

Advantages over the Prior Art

Embodiments of the invention allow for advantages over the prior art. By assigning simulated addresses to transactions of a first type, the transactions may be serialized utilizing a serialization approach already used for transactions of a different, second type. This means that no further code needs to be written, and take up space within the memory controller, for serializing transactions of the first type. Rather, the serialization approach already used for transactions of the second type is leveraged for use for transactions of the first type.

Other Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. As another example, the system that has been described has two memory controllers. However, more or less memory controllers may also be used to implement a system in accordance with the invention. Accordingly, the scope of protection of this invention is limited only by the following claims and their equivalents.

We claim:

1. A method comprising:

assigning a simulated address to a transaction of a first type; and, serializing the transaction relative to other transactions of the first type utilizing a serialization approach for transactions of a second type.

2. The method of claim 1, wherein assigning the simulated address to the transaction of the first type comprises assigning a fake address to the transaction.

3. The method of claim 1, wherein assigning the simulated address to the transaction of the first type comprises assigning an address to the transaction non-representative of an actual utilizable address.

4. The method of claim 1, wherein assigning the simulated address to the transaction of the first type comprises assigning an address that is unique among the transaction and the other transactions of the first type.

5. The method of claim 1, wherein assigning the simulated address to the transaction of the first type comprises selecting one of a plurality of address lists from which the simulated address is determined for assignment to the transaction.

6. The method of claim 5, wherein assigning the simulated address to the transaction of the first type further comprises masking attributes of the transaction utilizing a mask corresponding to the one of the plurality of address lists selected, to determine the simulated address.

7. The method of claim 1, wherein assigning the simulated address to the transaction comprises masking attributes of the transaction to determine the simulated address.

8. The method of claim 1, further comprising receiving the transaction before assigning the simulated address to the transaction.

9. The method of claim 1, further comprising effecting the transaction.

10. A system comprising:

a plurality of processors;

local random-access memory (RAM) for the plurality of processors; and, at least one memory controller to manage transactions relative to the local RAM, each memory controller assigning simulated addresses to those of the transactions that are of a first type, and serializing those of the transactions that are of the first type utilizing a serialization approach for those of the transactions that are of a second type.

11. The system of claim 10, wherein the at least one memory controller is divided into a first memory bank and a second memory bank, a first memory controller of the at least one memory controller managing transactions relative to the first memory bank, and a second memory controller of the at least one memory controller managing transactions relative to the second memory bank.

12. The system of claim 10, further comprising a plurality of nodes, a first node including the plurality of processors, the local RAM, and the at least one memory controller, each other node also including a plurality of processors, local RAM, and at least one memory controller, the plurality of nodes forming a non-uniform memory access (NUMA) architecture in which each node is able to remotely access the local RAM of other of the plurality of nodes.

13. The system of claim 10, wherein those of the transactions that are of the first type comprise non-coherent input/output (I/O) transactions.

14. The system of claim 13, wherein the non-coherent I/O transactions comprise at least one of: control status register (CSR) transactions, non-coherent I/O requests, and non-coherent I/O responses.

15. The system of claim 10, wherein the simulated addresses comprise unique fake addresses.

16. The system of claim 10, wherein the simulated addresses comprise addresses that are non-representative of actual utilizable addresses.

17. The system of claim 10, wherein each of the first and the second memory controllers comprises an application-specific integrated circuit (AS IC).

18. A memory controller comprising:

a pipeline having a plurality of stages to serialize and convert transactions to sets of actions to effect the transactions, those of the transactions of a first type assigned simulated addresses prior to serialization utilizing a serialization approach for those of the transactions of a second type.

19. The memory controller of claim 18, wherein the transactions of the first type are serialized prior to entry into the pipeline.

20. The memory controller of claim 18, wherein the transactions of the first type are serialized upon entry into the pipeline.

* * * * *